(12) United States Patent
Rathgeber

(10) Patent No.: US 6,542,069 B1
(45) Date of Patent: Apr. 1, 2003

(54) METHOD OF PROTECTING COMPONENTS CONNECTED TO A CAR RADIO

(75) Inventor: Stefan Rathgeber, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/342,157

(22) Filed: Jun. 22, 1999

(30) Foreign Application Priority Data

Jun. 27, 1998 (DE) .......................................... 198 28 751

(51) Int. Cl.[7] .......................... G05B 23/00; G06F 7/04; G08B 19/00
(52) U.S. Cl. ........................ 340/5.3; 340/426; 340/5.8; 340/5.6
(58) Field of Search ...................... 340/5.3, 426, 5.8, 340/5.1, 568.1, 5.6, 5.72, 5.65, 5.67; 380/201

(56) References Cited

U.S. PATENT DOCUMENTS 5,689,563 A * 11/1997 Brown et al. ................. 380/23
5,870,018 A * 2/1999 Person et al. ................ 340/426

* cited by examiner

Primary Examiner—Michael Horabik
Assistant Examiner—Vernal Brown
(74) Attorney, Agent, or Firm—Kenyon & Kenyon

(57) ABSTRACT

To protect components connected to a car radio, which each have a microprocessor and are connected to the car radio via a bus, when the component is connected to the car radio for the first time, a specific ID signal, which is stored in the component so as to be secured against access by the user, is transmitted by the car radio to the component via the bus. When the component and/or the car radio are turned on again, the ID signal stored in the component is compared to the ID signal of the car radio and the component and/or the car radio cannot be turned on unless the ID signal of the car radio is identical to (matches) the stored ID signal. Thus, the car radio, which is theft-protected per se, assumes a "guardian" function for the connected components.

4 Claims, 1 Drawing Sheet

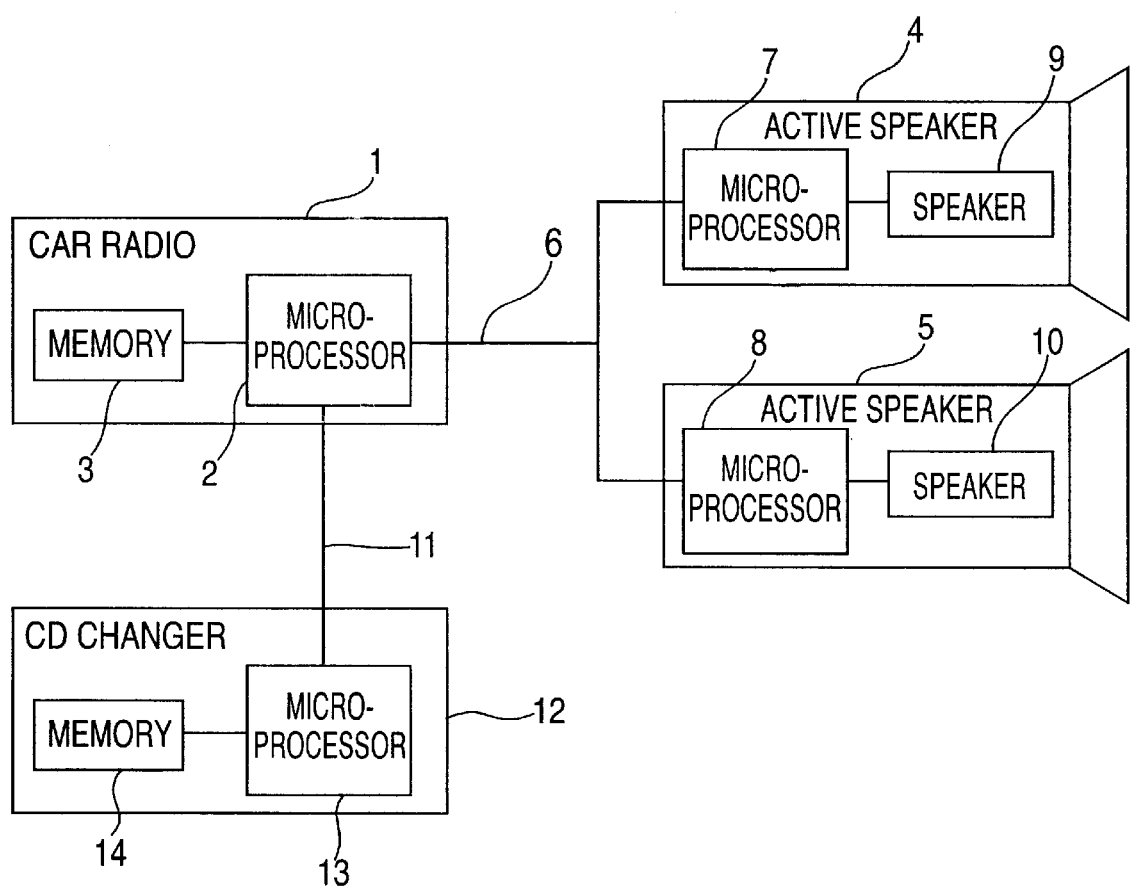

METHOD OF PROTECTING COMPONENTS CONNECTED TO A CAR RADIO

FIELD OF THE INVENTION

The present invention relates to a method of protecting components connected to a car radio, which each have a microprocessor and are connected to the car radio via a bus.

BACKGROUND INFORMATION

It is known that car radios are subject to increased risk of theft. Therefore numerous safety (security) mechanisms are known to protect the car radio against theft; some of these have been in use. These include, for example, designing a car radio to have a removable operating part, a turn-on inhibiting circuit preventing the car radio from turning-on until an individual numeric code is entered, the capability of switching on the car radio only by using a key card, etc. It can therefore be assumed that the car radio itself is adequately protected against theft.

The constant improvement in music reproduction quality in car equipment has resulted for many years in the use of more and more expensive components with the car radio, whose values are comparable to or even higher then that of the car radio. Such components include active boxes, CD changers, navigation devices, external displays, etc.

The task at hand is to protect these components used with the car radio against theft, in the same way as the car radio itself is protected against theft. This would, however, be very inconvenient in that individual numerical codes would have to be entered in each component or each component would have to be switched on using a separate key card. Such a method is not practicable, so that no theft protection has so far been used for the components.

An object of the present invention is to provide theft protection for components connected to a car radio that is convenient to handle.

SUMMARY OF THE INVENTION

In a method according to the present invention, when the component is connected to a car radio for the first time, a specific identification signal is transmitted from the car radio to the component via the bus, this signal is stored in the component so it cannot be accessed by the user and, when the component is turned on again, the ID signal stored in the component is compared with that of the car radio and the component and/or the car radio can be turned on to be ready for operation only if the ID signal of the car radio is identical to that of the stored ID signal.

The present invention provides a theft protection method that uses the car radio, which is itself safe from theft, as a "guardian." When it is connected to the car radio, a component new from the factory is assigned by the method according to the present invention to the car radio by the ID signal transmitted by the car radio and stored in the component. The component can only be operated as long as it remains connected to the car radio. Therefore, removing a component is useless, since it cannot be connected to another car radio so that it can still operate. Thus, the principle according to the present invention implements an anti-theft method that requires no additional action on the part of the user.

Should a component be legitimately connected to another car radio because the component has been sold or the owner of the component wishes to connect the latter to another car radio, for example, the initial assignment of the component to the car radio may be removed via the car radio recognized as belonging to the component. If such a release of the component using the car radio is no longer possible, since the latter is no longer operable, authorized dealers may release the component using a special decoder box upon presentation of evidence of ownership.

The comparison according to the present invention between the ID signal of the car radio and the ID signal stored in the component, which takes place when the car radio is turned on again may occur by the specific ID signal from the car radio to the component being repeated for the comparison to be made in the component. This procedure ensures greater security against manipulation compared to a comparison taking place in the car radio, which is also conceivable.

To reinforce the assignment between the component and the car radio, a specific ID signal can also be transmitted by the component to the car radio when the component is connected for the first time; this ID signal is stored in the car radio and compared to the ID signal transmitted again by the component to the car radio whenever the car radio is turned on again. Double comparison is thus achieved.

It may be convenient to transmit the ID signal sent from the car radio to be stored in the component with a one-way encryption, in order to prevent the ID signal of the respective car radio to be obtained through analysis of the stored data word in the component.

BRIEF DESCRIPTION OF THE DRAWINGS

The FIGURE shows a block diagram for illustrating the method according to the present invention.

DETAILED DESCRIPTION

In the FIGURE, a theft-secured car radio 1 is provided with a microprocessor 2, which has a memory 3 connected to it. Microprocessor 2 organizes the connection of car radio 1 to two active speakers 4, 5, via a speaker bus 6. Speaker bus 6 ends in active speakers 4, 5 at one microprocessor 7, 8 each, which are connected to speakers 9, 10.

Also illustrated is a connection of car radio 1 via its microprocessor 2 and an additional bus 11 to, for example, a CD changer 12. The latter is also connected to bus 11 through a microprocessor 13, which interacts with a memory 14.

Active speakers 4, 5 and CD changer 12 thus represent components 4, 5, 12 connected to car radio 1, which have a non-negligible value and are therefore protected against theft according to the present invention via car radio 1.

For this purpose, when components 4, 5, 12 are connected for the first time, an ID signal is transmitted from car radio 1 to components 4, 5, 12 via the respective bus 6, 11. In components 4, 5, 12, microprocessors 7, 8, 13 recognize the ID signal and store the ID signal in the respective memories 9, 10, 14. It is important to the present invention that the information stored in memories 9, 10, 14 cannot be overwritten by the ID signal of another car radio. In any case, car radio 1, which corresponds to the stored ID signal, can itself release components 4, 5, 12 in a special program by deleting the ID signal stored in memories 9, 10, 14 by car radio 1 and thus removing the assignment created by car radio 1 of components 4, 5, 12 to car radio 1.

Furthermore, in order to establish the assignment between car radio 1 and components 4, 5, 12, when components 4, 5, 12 are PCT into operation for the first time and thus no ID signal has been written in the respective memories 9, 10, 14, they send an ID signal of their own through microprocessors 7, 8, 13 to microprocessor 2 of car radio 1, which is stored by microprocessor 2 in memory 3 of car radio 1. When car radio 1 is turned on again later, mutual identification takes place between car radio 1 and components 4, 5, 12, which is a prerequisite for turning components 4, 5, 12 and/or car radio 1 on for operation. It is convenient if at least one of the comparisons of the stored and transmitted ID signals is performed by microprocessor 7, 8, 13 of the connected components 4, 5, 12.

The theft protection according to the present invention for components 4, 5, 12 thus requires no additional action on the user's part. Only on the very rare occasions when the components are intentionally and legitimately operated with another car radio, is it necessary to remove the assignment of components 4, 5, 12 to car radio 1. For this purpose, car radio 1 can be provided with a special program, which can only be executed by the user through special access authorization (key card, special codes, etc).

What is claimed is:

1. A method for protecting at least one component, each of the at least one component including a microprocessor, the method comprising the steps of:

when the at least one component is connected, via a bus, to a car radio for a first time, providing an identification signal of the car radio from the car radio to the at least one component, and storing the identification signal in the at least one component so as to be secured against an access by a user;

when the user attempts to turn-on at least one of the car radio and the at least one component, comparing the identification signal stored in the at least one component to the identification signal of the car radio; and turning-on the at least one of the car radio and the at least one component only if the identification signal stored in the at least one component is identical to the identification signal of the car radio.

2. The method according to claim 1, wherein the comparing step includes the step of providing the identification signal of the car radio from the car radio to the at least one component, and wherein the comparison is performed in the at least one component.

3. The method according to claim 1, further comprising the steps of:

when the at least one component is connected to the car radio for the first time, providing a further identification signal of the at least one component from the at least one component to the car radio, and storing the further identification signal in the car radio; and when the user attempts to turn-on the at least one of the car radio and the at least one component, comparing the further identification signal stored in the car radio to the further identification signal of the at least one component.

4. The method according to claim 1, wherein the identification signal is provided from the car radio with a one-way encryption.

* * * * *

UNITED STATES PATENT AND TRADEMARK OFFICE
CERTIFICATE OF CORRECTION

PATENT NO.   : 6,542,069 B1
DATED        : April 1, 2003
INVENTOR(S)  : Stefan Rathgeber It is certified that error appears in the above-identified patent and that said Letters Patent is hereby corrected as shown below:

<u>Column 2,</u>
Line 67, change "PCT" to -- put --.

Signed and Sealed this

Twenty-third Day of December, 2003

JAMES E. ROGAN
*Director of the United States Patent and Trademark Office*